United States Patent
White

(10) Patent No.: US 9,473,040 B2
(45) Date of Patent: Oct. 18, 2016

(54) SYSTEMS AND METHODS FOR CONTROLLING ACTIVE RECTIFIERS

(71) Applicant: Hamilton Sundstrand Corporation, Charlotte, NC (US)

(72) Inventor: Adam M. White, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 216 days.

(21) Appl. No.: 14/297,081

(22) Filed: Jun. 5, 2014

(65) Prior Publication Data

US 2015/0357930 A1 Dec. 10, 2015

(51) Int. Cl.
*H02M 7/04* (2006.01)
*H02M 7/217* (2006.01)

(52) U.S. Cl.
CPC .................... *H02M 7/217* (2013.01)

(58) Field of Classification Search
CPC ...... H02M 5/4585; H02M 1/14; H02M 1/15; H02M 1/36; H02M 1/32; H02M 7/06; H02M 7/127; H02M 7/08; H02M 7/19; H02M 7/1557; H02M 3/33592; Y02B 70/126
USPC ......... 363/37, 44–46, 49, 52, 67–70, 84, 89, 363/125–127
See application file for complete search history.

(56) References Cited

U.S. PATENT DOCUMENTS

| | | | |
|---|---|---|---|
| 6,320,772 B1* | 11/2001 | Doyama | H02M 1/4208 363/127 |
| 6,385,057 B1 | 5/2002 | Barron | |
| 2009/0040800 A1* | 2/2009 | Sonnaillon | H02M 7/219 363/89 |
| 2012/0140537 A1 | 6/2012 | Fattal | |
| 2013/0094258 A1* | 4/2013 | Royak | H02M 1/32 363/89 |
| 2015/0303822 A1* | 10/2015 | Casimir | H02M 1/36 363/84 |

FOREIGN PATENT DOCUMENTS

| | | |
|---|---|---|
| EP | 0895339 A2 | 2/1999 |
| EP | 2509209 A2 | 10/2012 |
| EP | 2600517 A1 | 6/2013 |

OTHER PUBLICATIONS

Extended European Search Report 15169151.6-1809/2953252 dated Mar. 22, 2016.

* cited by examiner

*Primary Examiner* — Nguyen Tran
(74) *Attorney, Agent, or Firm* — Locke Lord LLP; Scott D. Wofsy; Christopher J. Cillié

(57) ABSTRACT

A method of controlling a rectifier includes receiving a gain factor, receiving a ramp interval, and generating a rectifier switch control voltage. The rectifier switch control voltage is an over-modulated rectifier switch control voltage generated by a pulse width modulator using the gain factor. The amount of over-modulation in the rectifier switch control voltage is decreased during the ramp interval for reducing transient voltage overshoot events at the start of active rectification.

14 Claims, 5 Drawing Sheets

SYSTEMS AND METHODS FOR CONTROLLING ACTIVE RECTIFIERS

BACKGROUND OF THE INVENTION

1. Field of the Invention

The present disclosure relates to power conversion, and more particularly to controlling active rectifiers for converting alternating current into direct current.

2. Description of Related Art

Rectifiers convert alternating current (AC) voltage into direct current (DC) voltage. Some rectifiers employ solid-state devices like diodes and transistors to rectify input AC voltage into DC voltage. Diodes are passive devices that allow input AC current to flow in one direction and oppose current flow in the opposite direction. Transistors are active devices that electrically open and close in response to a control voltage applied to the device. Some types of solid-state rectifiers convert input AC voltage into DC voltage in a passive mode, using diodes, and in an active mode, using switch devices.

One challenge to active rectification is controlling the output DC voltage active rectification begins. Ideally, the rectifier output DC voltage should transition to the commanded value of the output DC voltage without overshooting the commanded voltage value when active rectification begins. However, in certain types of rectifiers, the start of voltage regulation using active rectification can cause the output DC voltage to overshoot the voltage target. Such transient voltage overshoots can potentially damage the load. Conventional electrical systems therefore typically include supplemental circuitry or devices rated for higher voltage than otherwise required for mitigating the effect of such transient voltage overshoot events.

Conventional methods and systems have generally been considered satisfactory for their intended purpose. However, there is still a need in the art for improved systems and methods for controlling active rectifiers. The present disclosure provides a solution for this need.

SUMMARY OF THE INVENTION

A method of controlling a rectifier includes receiving a gain factor, receiving a ramp interval, and generating a rectifier switch control voltage. The rectifier switch control voltage is an over-modulated rectifier switch control voltage generated by a pulse width modulator using the gain factor. Over-modulation of the rectifier switch control voltage is decreased during the ramp interval for reducing transient voltage overshoot events at the start of active rectification.

In certain embodiments decreasing the gain factor can include decreasing the gain factor linearly during the ramp interval between the start and end of the ramp interval. Over-modulating the switch control voltage can include decreasing a gain factor of about 2 at the beginning of the ramp interval to about 1 at the end of the ramp interval. The gain factor can be held constant following tolling of the ramp interval.

In accordance with certain embodiments the method can include determining whether to actively or passively rectify received AC voltage. The method can include detecting an end of regulation, disabling the pulse width modulator, and passively rectifying received AC voltage. The pulse width modulator can be disabled (e.g. set to a low logic value) immediately upon detecting an end of regulation, e.g. an end of active rectification. It is contemplated the method can include detecting a beginning of regulation prior to tolling of the ramp interval, enabling the pulse width modulator, and actively rectifying received AC voltage.

It is also contemplated that in accordance with certain embodiments the method includes receiving a carrier waveform, receiving a modulator waveform, and scaling the modulator waveform using the gain factor. The scaled modulator waveform can be full-wave rectified. The full-wave rectified, scaled modulator waveform can be inverted, shifted, and compared with the carrier waveform. A rectifier switch control voltage can be formed from the compared waveforms that is high when the scaled, full-wave rectified, inverted and shifted modulator waveform has a greater voltage than the carrier waveform. The rectifier switch control voltage can be formed such that the voltage is low when the scaled, full-wave rectified, inverted and shifted modulator waveform has a lower voltage than the carrier waveform. It is further contemplated that the scaled modulator waveform can have a modulation index greater than 100%, such as about 200% for example, the modulation index corresponding to a ratio of a peak amplitude of the scaled modulator waveform to a peak-to-peak amplitude of the carrier waveform. The gain factor can correspond to a proportional increase in the modulation index, for example an incipient modulation index of about 90% in combination with a gain factor of about 2 induces a resultant modulation index of about 180%.

A rectifier system has a processor communicative with a memory. The memory has instructions recorded on it that, when read by the processor, cause the processor to receive a gain factor, receive a ramp interval, over-modulate a rectifier switch control voltage generated by a pulse width modulator using the gain factor and decrease the modulation index of the switch control voltage during the ramp interval by reducing the gain factor.

In embodiments, the instructions further cause the processor to receive a carrier waveform, receive a modulator waveform, scale the modulator waveform by the gain factor, full-wave rectify the scaled modulator waveform, invert and shift the full-wave rectified modulator waveform, and compare the scaled, full-wave rectified, inverted and shifted modulator waveform with the carrier waveform to form the rectifier switch control voltage. The rectifier switch control voltage can be high when the inverted modulator waveform is greater than carrier waveform. The rectifier system can include a VIENNA rectifier with both diodes and transistors. The rectifier system can passively rectify input AC current using rectifier diode circuitry, detect a start of regulation, actively rectify input AC current using switches within the circuitry and detect an end of regulation. It is contemplated memory can include a gain factor generator module, a multiplier module, a full-wave inverter module, a summing module, and a comparator communicative with one another.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
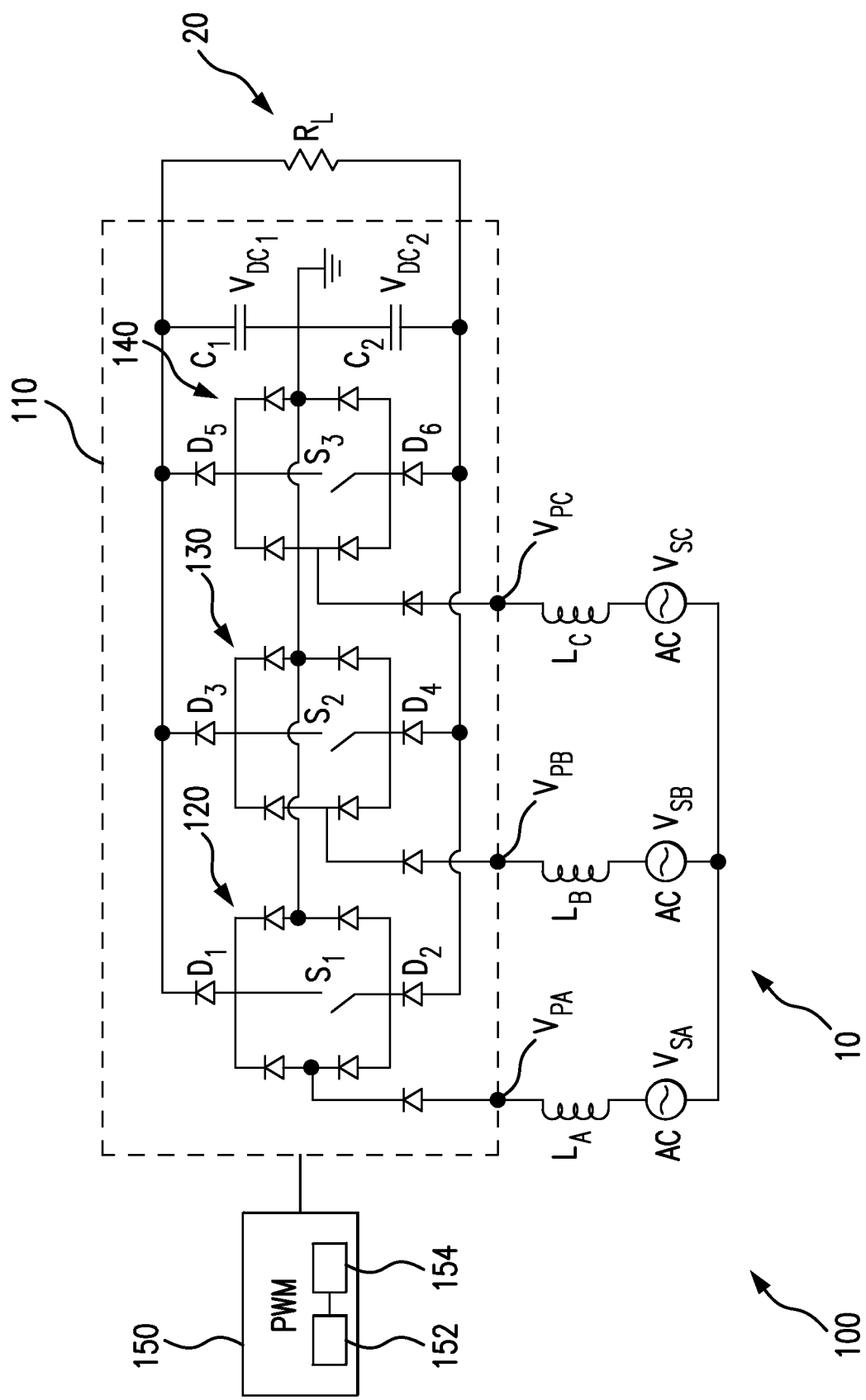
FIG. 1 is a circuit diagram of an exemplary embodiment of a rectifier constructed in accordance with the present disclosure, showing controller connected to the rectifier.

Reference will now be made to the drawings wherein like reference numerals identify similar structural features or aspects of the subject disclosure. For purposes of explanation and illustration, and not limitation, a partial view of an exemplary embodiment of an active rectification system in accordance with the disclosure is shown in FIG. 1 and is designated generally by reference character 100. Other embodiments of rectification systems and methods in accordance with the disclosure, or aspects thereof, are provided in FIGS. 2-7, as will be described. The systems and methods described herein can be used in power converter systems, such as multi-level rectifiers for example.

With reference to FIG. 1, rectifier system 100 is shown. Rectifier system 100 includes an active rectifier 110 connected between an alternating current (AC) power source 10, a direct current (DC) load 20, and a pulse width modulation (PWM) controller 150. AC power source 10 includes a first AC source $V_{sa}$, a second AC source $V_{sb}$, and a third AC source $V_{sc}$ that provide collectively provide a three-phase AC voltage to rectifier system 100. AC voltage sources $V_{sa}$, $V_{sb}$ and $V_{sc}$ are connected to rectifier 100 through inductors $L_a$, $L_b$ and $L_c$, respectively. PWM controller 150 is configured and disposed to control voltage at load 20 using gate-drive circuitry of rectifier 110. PWM controller 150 includes processor 152 communicative with a memory 154. Memory 154 is a non-transitory machine readable medium with instructions recorded thereon that, when read by processor 152, causes the processor to undertake certain operations as further discussed below. As also illustrated in FIG. 1, rectifier 110 is a three-phase, three-level active switching rectifier that may be realized using a VIENNA rectifier. However, it should be understood that example embodiments are not limited to the illustrated rectifier topology as any suitable three-phase three-level active rectifier may be used according to any desired implementation.

Rectifier 110 includes at least three switches, specifically a first switch $S_1$, a second switch $S_2$, and a third switch $S_3$. First switch $S_1$ is surrounded by a first balanced diode bridge 120. Second switch $S_2$ is surrounded by a second balanced diode bridge 130. Third switch $S_3$ is surrounded by a third balanced diode bridge 140. First diode bridge 120 is connected between a first diode $D_1$ and a second diode $D_2$. Second diode bridge 130 is connected between a third diode $D_3$ and a fourth diode $D_4$. Third diode bridge 140 is connected between a fifth diode $D_5$ and a sixth diode $D_6$. Each of first switch $S_1$, second switch $S_2$, and third switch $S_3$ are configured and adapted to electrically switch between at least an on-state and an off-state controllable by a control signal received from PWM controller 150, thereby realizing three-level switching and active rectification using switches with two states. As illustrated, the PWM controller 150 is in operative communication with first switch $S_1$, second switch $S_2$, and third switch $S_3$. During operation, PWM controller 150 directs each of first switch $S_1$, second switch $S_2$, and third switch $S_3$ to change between on and off states based upon a PWM control scheme as described herein.

Figure 2:
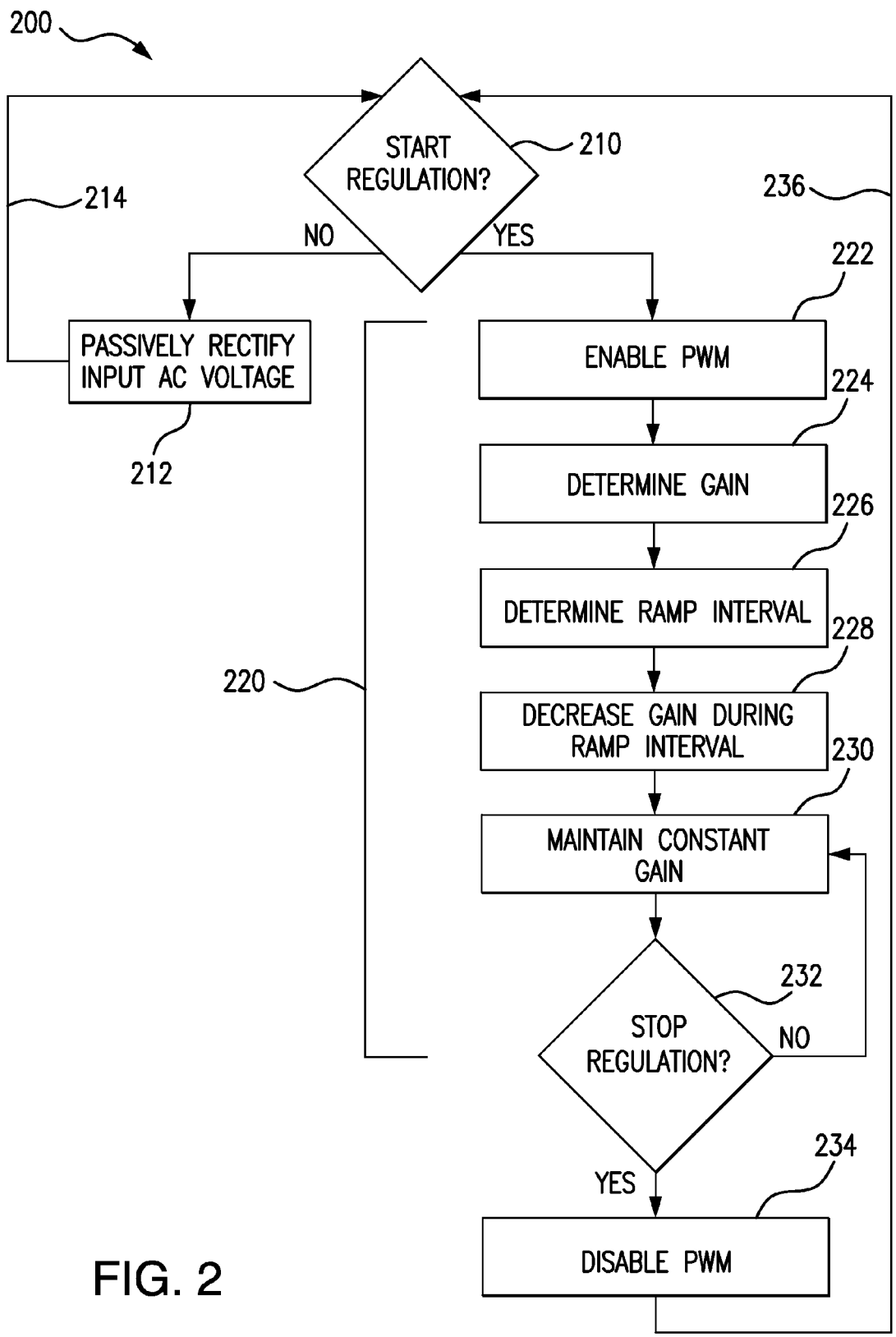
FIG. 2 is a process diagram of a method for controlling the rectifier of FIG. 1, showing processes for passively and actively rectifying alternating current (AC) voltage.

With reference to FIG. 2, a computer-implemented method 200 of controlling an active rectifier, e.g. rectifier 110, is shown. Method 200 includes a step 210 for determining whether to start regulation. Step 210 includes choosing one of selecting a passive regulation mode and active regulation mode. In passive regulation mode, input AC voltage is converted to DC voltage solely using diodes, e.g. diode bridges 120, 130 and 140. In active regulation, input AC voltage is converted to DC voltage by switching solid-state switches, e.g. switches S1, S2, and S3, between on and off states.

When the outcome of step 210 is to not start regulation, input AC voltage is passively rectified using a step 212 for passively rectifying input AC voltage followed by a step 214 for iteratively determining whether to start active rectification. When the outcome of step 210 is to start regulation, input AC voltage is actively rectified in a step 220 for actively rectifying input AC current. Step 220 further includes a step 222 for enabling a pulse width modulator, e.g. PWM 150, a step 224 for determining a gain factor, and a step 226 for determining a ramp interval. Determining a gain factor and/or determining a ramp interval can include receiving the gain factor. In certain embodiments the gain has a value of about 2.0. The gain and/or the ramp interval can be predetermined values resident in a memory 154 (shown FIG. 1) communicative with a processor 152 (shown in FIG. 1). As will be appreciated, the modulation index of the PWM control waveform changes correspondingly with the gain factor during the ramp interval.

Once the gain interval has tolled, the gain factor is held constant in a step 228, e.g. at a gain factor of 1.0, for maintaining a constant modulation index. Method 200 also includes a step 232 for determining whether to stop regulation. If it is determined to continue regulation the constant gain is maintained. If it is determined to stop regulation, the PWM is disabled in a step 234 and the rectifier returns to passive rectification in step 236.

Figure 3:
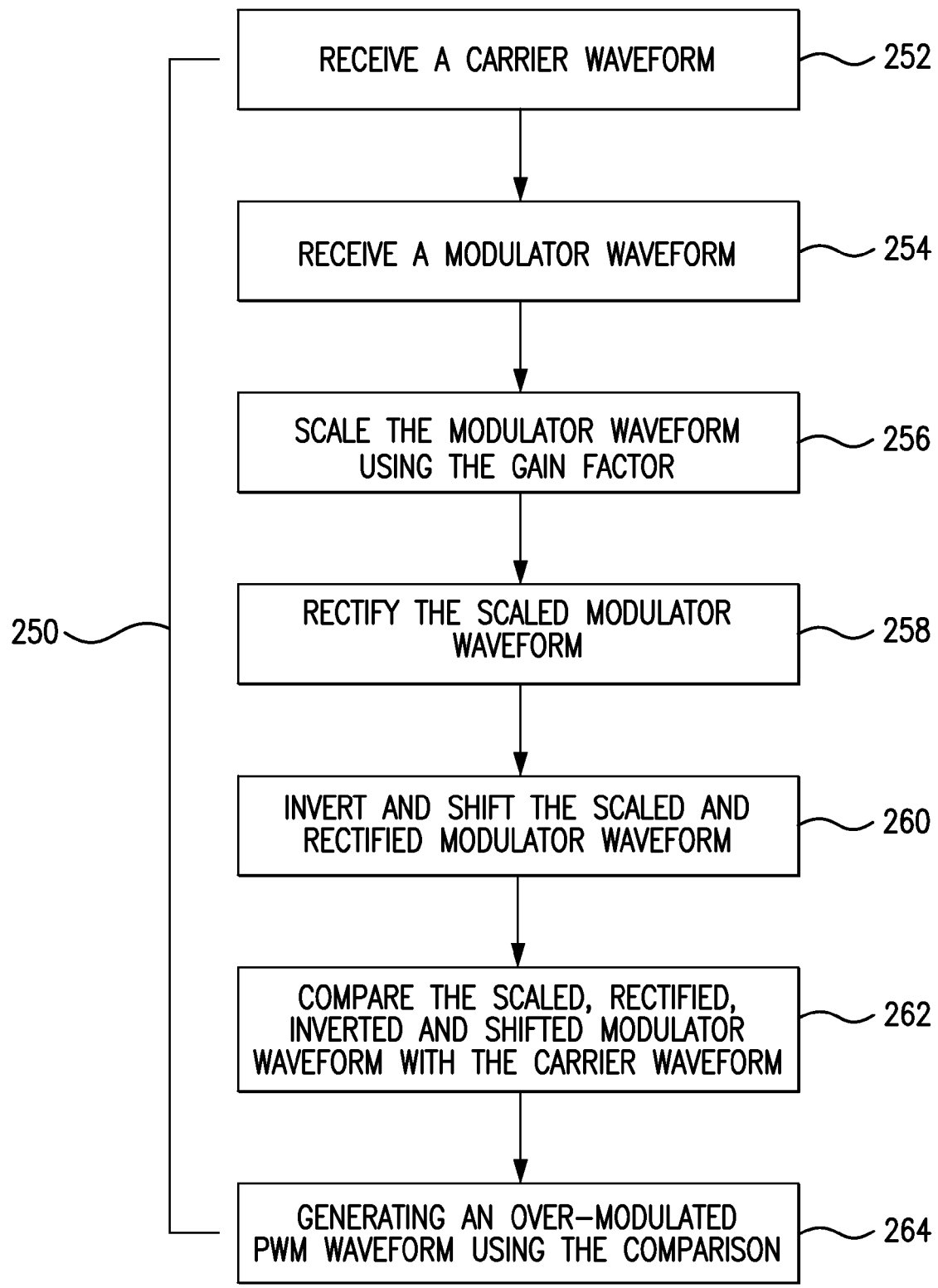
FIG. 3 is a process diagram of a method for actively rectifying AC voltage using the rectifier of FIG. 1, showing processes for over-modulating a pulse width controller (PWM) waveform.

With reference to FIG. 3, method 200 can additionally include a step 250 for over-modulating a rectifier switch control voltage generated by the PWM using the gain factor. Step 250 includes a step 252 for receiving a carrier waveform, a step 254 for receiving a modulator waveform, and a step 256 for scaling the waveform using the gain factor. Over-modulating a rectifier switch control voltage also includes a step 258 for inverting any negative portions of the modulator waveform, thus creating a rectified and scaled modulator waveform. Additionally, step 250 can include a step 260 for inverting portions of the waveform created in step 258 and a step 262 for comparing the waveform created in step 260 with the carrier waveform (shown in FIG. 5). The comparison is used in a step 264 to generate an over-modulated PWM waveform (shown in FIG. 6).

Figure 4:
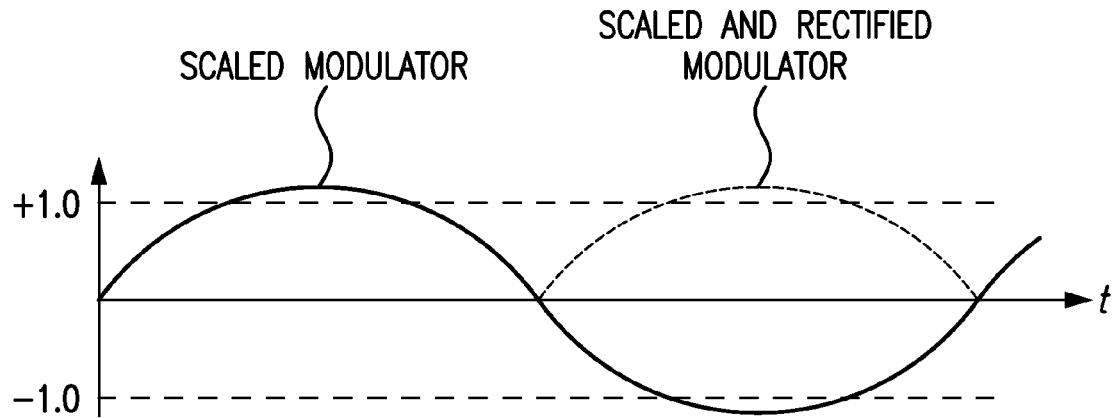
FIG. 4 is a graph of a modulator waveform used for generating the PWM waveform of FIG. 3, showing modulator waveforms following application of a gain and following a negative waveform portion inversion step.
Figure 5:
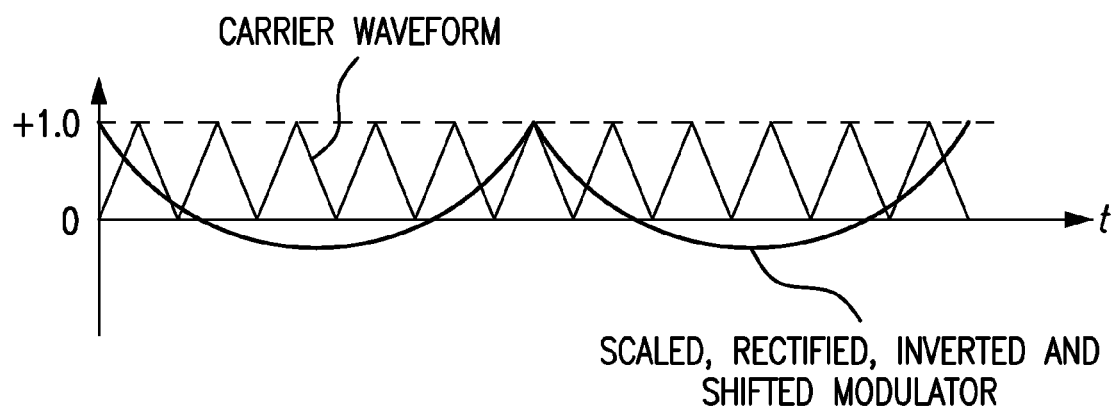
FIG. 5 is a graph of the modulator and a carrier waveform used for generating the PWM waveform of FIG. 3, showing modulator waveform following inversion and shifting of positive waveform portions for comparison with the carrier waveform.
Figure 6:
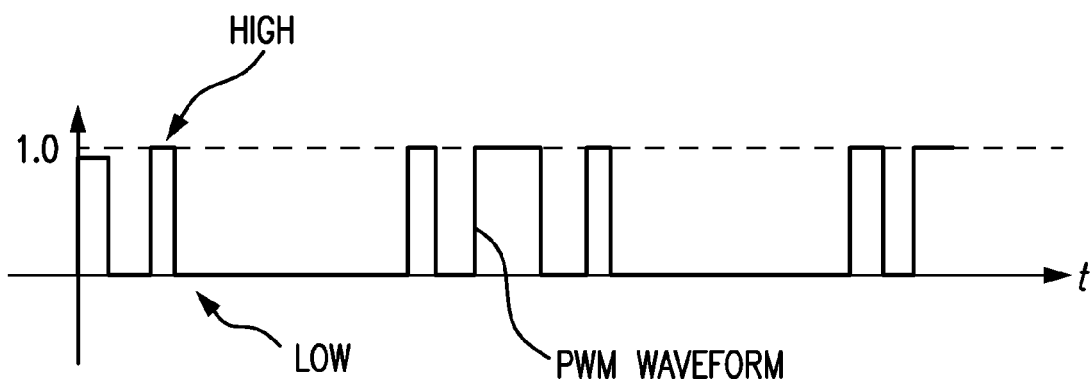
FIG. 6 is a graph of the PWM waveform generated using the method of FIG. 3, showing extended intervals of low values induced by the gain applied to the modulator waveform.

With reference to FIGS. 4-6, charts of waveforms are shown according to an exemplary embodiment. FIG. 4 shows a scaled waveform with a sinusoidal waveform. As received, the incipient waveform has maximum amplitude of about 1.0 and a minimum amplitude of about −1.0. FIG. 4 shows the modulator waveform following application of a 1.25 gain factor. This increase changes the modulator waveform by increasing its maximum and minimum magnitude to about 1.25 and about −1.25, respectively. FIG. 4 also shows in dashed line the modulator waveform following inverting a negative portion of the waveform, resulting in a scaled and rectified modulator.

FIG. 5 shows a carrier waveform with a triangular shape. The carrier waveform is constant, the waveform varying between a peak of 1.0 and a 0.0 minimum. Also illustrated in FIG. 5 is the resultant modulator waveform following scaling, rectification, inversion and shifting of the incipient modulator waveform. As a result of the gain factor, rectification, inversion and shifting applied to the incipient modulator waveform, the minimum of the resultant modulator is about −0.25 volts. This places portions of the resultant modulator waveform below the carrier wave. Placing portions of the resultant modulator waveform in turn creates extended intervals without transistor switching following the start of regulation. As will be appreciated, duration of these intervals corresponds to the size of waveform portions below the carrier waveform and the numerical value of the gain factor applied.

FIG. 6 shows the over-modulated waveform generated using the comparison of the carrier waveform and modulator waveform. The modulator waveform is high when the modulator waveform has greater magnitude than the carrier waveform and is low when the modulator waveform has lower magnitude than carrier waveform. Notably, gain factors above 1.0 increase intervals wherein the modulator waveform has lower magnitude than the carrier waveform. This influences the relationship between high and low intervals on the PWM waveform and changes the intervals when rectifier switches are in on and off states in the during the ramp interval subsequent to the start of rectification.

Figure 7:
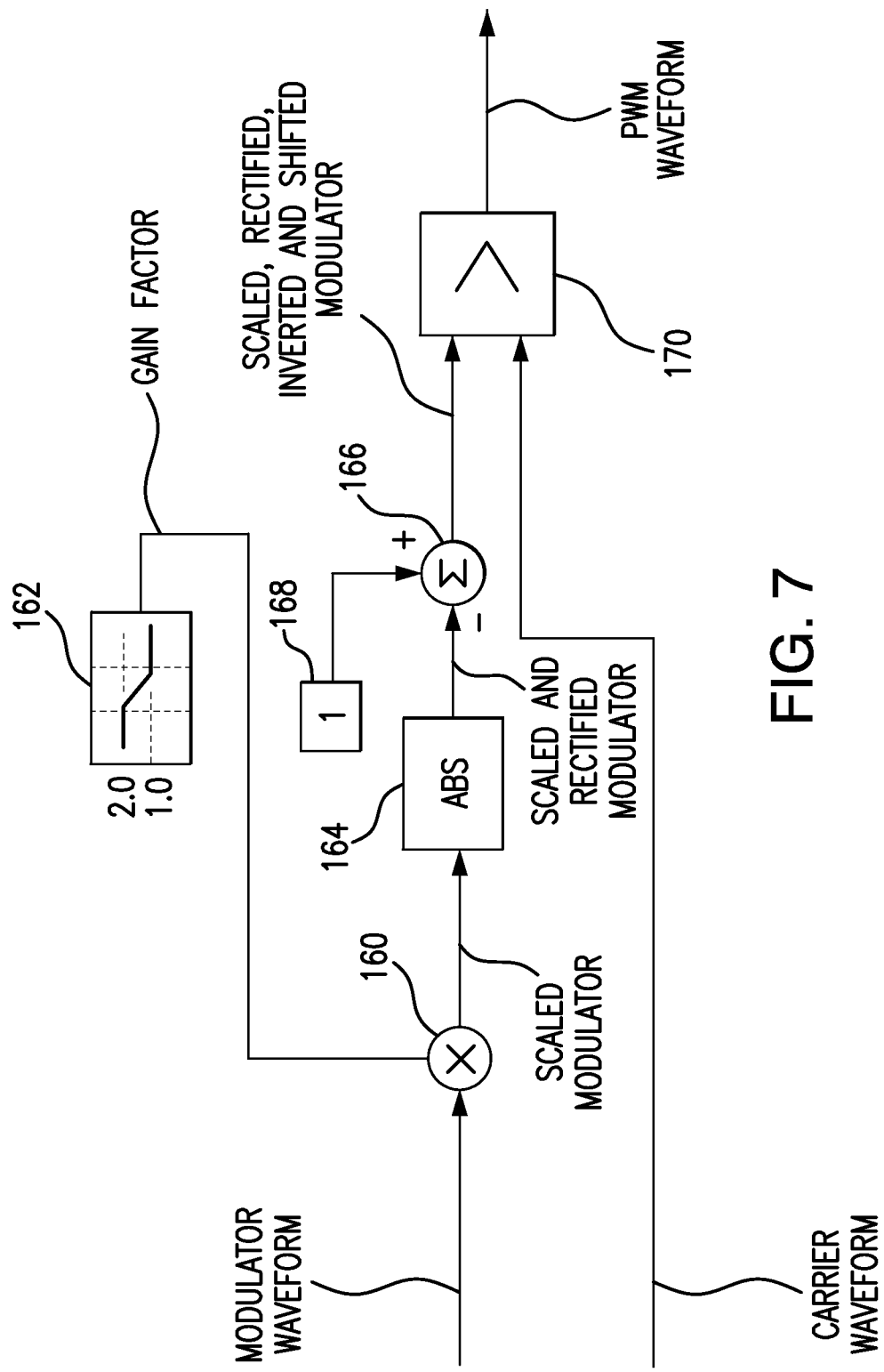
FIG. 7 is a block diagram of the PWM controller of FIG. 1, showing modules of the controller.

With reference to FIG. 7, a schematic view of logic modules resident within PWM controller 150 is shown. Memory 154 (shown in FIG. 1) includes a multiplier module 160, a gain factor generator module 162, a signal rectifier module 164, a summing module 166, a shift module 168, and a comparator module 170 in communication with one another. Although described in terms of software instructions recorded on a non-transitory machine readable medium, it is contemplated any one or combination of the modules can be implemented in software or instructions recorded on memory 154, circuitry within PWM 150, or a combination of software and circuitry.

Gain factor generator module 162 is configured to generate a gain factor that is provided to multiplier 160. In the illustrated embodiment the gain factor starts at 2.0 and decreases linearly over a ramp interval to a value of 1.0 once the ramp interval has tolled. Multiplier module 160 receives the gain factor and a modulator waveform and scales the modulator waveform by multiplying the modulator waveform by the gain factor. This generates a scaled (or gained) modulator waveform (shown as a solid line trace in FIG. 4).

Multiplier 160 outputs the scaled modulator waveform to signal rectifier 164, illustrated in FIG. 7 schematically as an absolute value function generator. Signal rectifier 164 receives the scaled modulator waveform and rectifies the scaled modulator waveform by inverting negative portions of the waveform (shown as a dashed line trace in FIG. 4). This generates scaled, rectified modulator waveform that signal rectifier 164 provides to a negative terminal of summing module 166.

Summing module 166 receives the scaled, rectified modulator waveform and a shift voltage from shift module 168. Receiving the scaled, rectified modulated waveform at a negative terminal inverts the scaled, rectified modulator waveform, thereby generating a scaled, rectified, and inverted modulator waveform. Summing modulate 166 further adds the shift voltage received from shift module 168 to the scaled, rectified, and inverted waveform, thereby generating a scaled, rectified, inverted and shifted modulator waveform (or resultant modulator waveform) (shown in FIG. 5). Summing module 166 thereafter provides the resultant modulator waveform to comparator module 170.

Comparator module 170 receives the resultant modulator waveform and a carrier waveform (both shown in FIG. 5) and compares both. The comparison is performed continuously, and based on the comparison, comparator module 170 outputs a binary output including high and low output voltage. In the illustrated embodiment, the output is a high voltage, e.g. 1.0 volts, during intervals where the resultant modulator waveform has a voltage greater than that of the carrier waveform, and is a low voltage, e.g. 0.0 volts, during intervals during which the carrier waveform has a greater voltage than the resultant modulator waveform. The high/low output voltage is synthesized as a PWM waveform (shown in FIG. 6) output by PWM controller 150 (shown in FIG. 1) to rectifier 110 (shown in FIG. 1) for purposes of controlling the on and off states of the rectifier switches (shown in FIG. 1).

As will be appreciated by those skilled in the art, higher gain values correspond to prolonged low voltage intervals in the PWM waveform. Prolonging low intervals in the PWM waveform over-modulate the rectifier which in turn reduces the tendency of some types of rectifiers to overshoot their target output voltage at the start of regulation (e.g. at the start of active rectification). Embodiments of the systems and methods described herein can provide a target output voltage at the start of rectification under low-load/low-voltage by using a modulation index less than or equal to 100% at the start of active rectification to bridge the difference in DC output voltage during passive rectification (effectively infinite modulation index) and active rectification at 100% modulation index. This is because during operation in the linear modulation region, i.e. 0-100% modulation index, the input current of the rectifier is commutated between a passive rectification current path (e.g. diodes) and between an active rectification path (e.g. solid-state switches) once per carrier wave period. For the lowest possible output DC voltage, i.e. passive rectification, the input current of the rectifier stays within the uncontrollable diodes of the passive rectification circuit. In order to operate at low boost ratios (i.e. the ratio between the active rectification and passive rectification DC voltages), over-modulation can be used to limit the portion of the fundamental cycle that PWM occurs, thereby achieving boost ratios lower than achievable solely using continuous switching.

The methods and systems of the present disclosure, as described above and shown in the drawings, provide for power converters with superior properties including improved output voltage control under low load conditions. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of controlling a rectifier, comprising:
receiving a gain factor;
receiving a ramp interval;
over-modulating a rectifier switch control voltage generated by a pulse width modulator using the gain factor;
decreasing over-modulation of the rectifier switch control voltage during the ramp interval by reducing the gain factor;
detecting an end of regulation;
disabling the pulse width modulator; and
passively rectifying received AC voltage.

2. A method as recited in claim 1, further including determining whether to actively or passively rectify received AC voltage.

3. A method as recited in claim 1, further including:
detecting a beginning of regulation prior to tolling of the ramp interval;
enabling the pulse width modulator; and
actively rectifying received AC voltage.

4. A method as recited in claim 1, further including holding the gain factor constant following the ramp interval.

5. A method as recited in claim 1, wherein decreasing over-modulation of the switch control voltage includes decreasing a gain factor of about 2 to about 1.

6. A method as recited in claim 1, wherein decreasing over-modulation of the switch control voltage includes decreasing the gain factor linearly during the ramp interval.

7. A method of controlling a rectifier, comprising:
receiving a gain factor;
receiving a ramp interval;
over-modulating a rectifier switch control voltage generated by a pulse width modulator using the gain factor;
decreasing over-modulation of the rectifier switch control voltage during the ramp interval by reducing the gain factor;
receiving a carrier waveform;
receiving a modulator waveform;
scaling the modulator waveform using the gain factor;
full-wave rectifying the scaled modulator waveform;
inverting the scaled and full-wave rectified modulator waveform;
shifting the scaled, full-wave rectified and inverted modulator waveform; and
comparing the scaled, full-wave rectified, inverted and shifted modulator waveform with the carrier waveform to form a rectifier switch control voltage, wherein the rectifier switch control voltage is high when the scaled, full-wave rectified, inverted and shifted modulator waveform has a greater voltage than a voltage of the carrier waveform.

8. A method as recited in claim 7, wherein the scaled modulator waveform has a modulation index greater than 100%.

9. A method as recited in claim 8, wherein the modulation index corresponds to a ratio of a peak amplitude of the scaled modulator waveform to a peak-to-peak amplitude of the carrier waveform.

10. A rectifier system, comprising:
a processor; and
a memory communicative with the processor and having instructions recorded thereon that, when read by the processor, cause the processor to:
receive a gain factor;
receive a ramp interval;
over-modulate a rectifier switch control voltage generated by a pulse width modulator using the gain factor;
decrease over-modulation of the switch control voltage during the ramp interval by reducing the gain factor;
detect an end of regulation;
disable the pulse width modulator; and
passively rectify received AC voltage.

11. A system as recited in claim 10, wherein the memory further includes:
a gain factor generator;
a multiplier module communicative with gain factor generator;
an inverter and summing module communicative with the multiplier module; and
a comparator communicative with the summing module.

12. A system as recited in claim 10, further including a VIENNA rectifier operatively associated with the processor.

13. A system as recited in claim 10, wherein the instructions further cause the processor to:
passively rectify input AC current using diodes;
detect a start of regulation;
actively rectify input AC current using switch devices connected to the diodes; and
detect an end of regulation subsequent to tolling of the ramp interval.

14. A rectifier system, comprising:
a processor; and
a memory communicative with the processor and having instructions recorded thereon that, when read by the processor, cause the processor to:
receive a gain factor;
receive a ramp interval;
over-modulate a rectifier switch control voltage generated by a pulse width modulator using the gain factor;
decrease over-modulation of the switch control voltage during the ramp interval by reducing the gain factor;
receive a carrier waveform;
receive a modulator waveform;
scale the modulator waveform by the gain factor;
full-wave rectify the scaled modulator waveform;
invert the scaled and full-wave rectified modulator waveform;
shift the scaled, full-wave rectified and inverted full-wave rectified waveform;
compare the scaled, full-wave rectified, inverted and shifted modulator waveform with the carrier waveform to form a rectifier switch control voltage, wherein the rectifier switch control voltage is high when voltage of the scaled, full-wave rectified, inverted and shifted modulator waveform is greater than voltage of the carrier waveform.

* * * * *